(12) United States Patent
Ciofolo-Veit et al.

(10) Patent No.: US 8,463,008 B2
(45) Date of Patent: Jun. 11, 2013

(54) SEGMENTATION OF THE LONG-AXIS LATE-ENHANCEMENT CARDIAC MRI

(75) Inventors: Cybele Ciofolo-Veit, Meudon (FR); Maxim Fradkin, Puteaux (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 297 days.

(21) Appl. No.: 13/060,282

(22) PCT Filed: Aug. 25, 2009

(86) PCT No.: PCT/IB2009/053723
§ 371 (c)(1),
(2), (4) Date: Feb. 23, 2011

(87) PCT Pub. No.: WO2010/023618
PCT Pub. Date: Mar. 4, 2010

(65) Prior Publication Data
US 2011/0158496 A1 Jun. 30, 2011

(30) Foreign Application Priority Data
Sep. 1, 2008 (EP) .................... 08305513

(51) Int. Cl.
*G06K 9/00* (2006.01)
(52) U.S. Cl.
USPC .......................................................... 382/128
(58) Field of Classification Search
USPC ....... 382/128–134; 128/920–925; 356/39–49; 600/407–414, 424–426; 345/581–618
See application file for complete search history.

(56) References Cited

U.S. PATENT DOCUMENTS
2007/0014452 A1 1/2007 Suresh et al.

FOREIGN PATENT DOCUMENTS
WO 2007058997 A2 5/2007

OTHER PUBLICATIONS
Ciofolo et al: "Automatic Myocardium Segmentation in Late-Enhancement MRI"; 5th IEEE International Symposium on Biomedical Imaging: From Nano to Macro, May 2008, pp. 225-228.

(Continued)

*Primary Examiner* — Atiba O Fitzpatrick

(57) ABSTRACT

The invention relates to a system (200) for delineating endocardial and epicardial contours of the heart in an image computed from long-axis image data, using a template defining curves for delineating the endocardial and epicardial contours in the image, the system (200) comprising a template-positioning unit (205) for positioning the template on the basis of short-axis image data, a scar map initialization unit (210) for initializing a scar map for use in adapting the template to the image, based on a prior segmentation of the endocardial and epicardial surfaces on the basis of the short-axis image data, and an adaptation unit (220) for adapting the template to the image, using a criterion function, the criterion function comprising terms describing the attraction of the template to image features and terms describing internal interactions within the template, and wherein at least one term of the criterion function is defined on the basis of the scar map. Identifying image pixels comprised in the scar map improves the definition of the criterion function by including at least one and possibly a plurality of criterion function terms defined on the basis of the scar map. Including criterion function terms defined on the basis of the scar map for adapting the template (i.e. a deformable model) for defining the endocardial and epicardial contours to the long-axis image data helps avoiding exclusion of the scar tissue from the delineated myocardial tissue and thus improves the delineation of the endocardial and epicardial contours of the heart.

13 Claims, 8 Drawing Sheets

OTHER PUBLICATIONS

Cho et al: "Cardiac Segmentation by a Velocity-Aided Active Contour Model"; Computerized Medical Imaging and Graphics, Jan. 2006, vol. 30, No. 1, pp. 31-41.

Brigger et al: "B-Spline Snakes: A Flexible Tool for Parametric Contour Detection"; IEEE Transactions on Image Processing, Sep. 2000, vol. 9, No. 9, pp. 1484-1496.

Unser et al: "B-Spline Signal Processing: Part 1—Theory"; IEEE Transactions on Signal Processing, Feb. 1993, vol. 41, No. 2, pp. 821-832.

Blok et al: "Long-Axis Cardiac MRI Contour Detection With Adaptive Virtual Exploring Robot"; Proceedings of the Third International Conference on Functional Imaging and Modeling of the Heart, FIMH 2005, LNCS 3504, pp. 54-64.

Koikkalainen et al: "Segmentation of Cardiac Structures Simultaneously From Short- and Long-Axis MR Images"; Proceedings of the 7th International Conference on Medical Image Computing and Computer-Assisted Intervention (MICCAI'04), LNCS 3216, pp. 427-434.

$$C_i(s) = C(s) - 0.5\,w(s)n(s)$$
$$C_o(s) = C(s) + 0.5\,w(s)n(s)$$

SEGMENTATION OF THE LONG-AXIS LATE-ENHANCEMENT CARDIAC MRI

FIELD OF THE INVENTION

The invention relates to image segmentation and more particularly to delineating an anatomical structure in an image computed from image data.

BACKGROUND OF THE INVENTION

Viability assessment is essential for surgery and therapy planning following a heart attack. In particular, the proportion of viable myocardium is a major factor in determining whether a patient may benefit from a revascularization procedure. In addition to estimating the left ventricle thickness and thickening, it is possible to visualize normal, ischemic, and non-viable areas with high spatial resolution, using contrast-enhanced imaging techniques and particularly late-enhancement cardiac magnetic resonance (LECMR). To locate and quantify non-viable tissues, it is important to delineate the endo- and epicardial contours on all available views of the heart. In particular, the contours obtained on long-axis acquisitions provide information which is complementary to the information obtained from short-axis data, because the spacing between short-axis slices is too large (up to 10 mm) to reconstruct an accurate 3D heart volume for viability assessment.

Designing an automatic method to delineate the endo- and epicardial contours is difficult, mainly because of the non-homogeneous aspect of the myocardium, resulting from contrast agent accumulation in ischemic and non-viable areas. These regions appear in white while the healthy parts are dark and the surrounding organs vary from grey to dark. FIG. 1 offers two examples of LECMR long axis (LA) 2-chamber views obtained from two patients, showing a healthy myocardium (11), the blood pool (12) and abnormal tissues (13). The challenge is thus to extract a structure containing both dark and white areas from a textured environment. Moreover, the borders of the white regions often appear very fuzzy, especially if they are close to the blood pool, which makes it particularly difficult to correctly locate the endocardium. While these difficulties are also encountered when processing short-axis (SA) data, there is an additional difficulty with LA views: the myocardium does not appear with an easily detectable ring-shape; it is thus necessary to find a new way to locate it before finding its contours. Even though a number of scientific publications deal with the segmentation of long-axis images (using only LA data: M. Blok, M. G. Danilouchkine, C. J. Veenman, F. Admiraal-Behloul, E. A. Hendriks, J. H. C. Reiber and B. P. F. Lelieveldt, "Long-axis cardiac MRI contour detection with adaptive virtual exploring robot", *Proceedings of the Third International Conference on Functional Imaging and Modeling of the Heart (FIMH'2005)*, pp. 54-64, Springer, 2005; using LA and SA data: Koikkalainen, M. Pollari, J. Lötjönen, S. Kivistö and K. Lauerma, "Segmentation of cardiac structures simultaneously from short- and long-axis MR images", Proceedings of the $7^{th}$ International Conference on Medical Image Computing and Computer-Assisted Intervention (MICCAI'04), pp. 427-434, Springer, 2004), none of them makes full use of the LECMR tissue viability data.

SUMMARY OF THE INVENTION

It would be advantageous to provide an alternative solution for delineating myocardial contours in LECMR LA image data in the presence of scar tissues, which would also be useful for delineating other structures in images acquired using various image acquisition modalities.

Thus, in an aspect, the invention provides a system for delineating endocardial and epicardial contours of the heart in an image computed from long-axis image data, using a template defining curves for delineating the endocardial and epicardial contours in the image, the system comprising:

a template-positioning unit for positioning the template on the basis of short-axis image data;

a scar map initialization unit for initializing a scar map for use in adapting the template to the image, based on a prior segmentation of the endocardial and epicardial surfaces on the basis of the short-axis image data; and an adaptation unit for adapting the template to the image, using a criterion function, the criterion function comprising terms describing attraction of the template to image features and terms describing internal interactions within the template, and wherein at least one term of the criterion function is defined on the basis of the scar map.

Identifying image pixels comprised in the scar map improves the definition of the criterion function by including at least one and possibly a plurality of criterion function terms defined on the basis of the scar map. Including criterion function terms defined on the basis of the scar map for adapting the template (i.e. a deformable model) for delineating the endocardial and epicardial contours to the long-axis image data helps avoiding exclusion of the scar tissue from the delineated myocardial tissue and thus improves the delineation of the endocardial and epicardial contours of the heart.

In an embodiment, the system further comprises a scar map update unit for updating the scar map, based on the adapted template. Updating the scar map, based on the results of the adaptation of the template to the image, allows improved detection of the scar tissue within the myocardial tissue, wherein the myocardial tissue is described by the adapted template. The steps of adapting the template by the adaptation unit and of updating the scar map by the scar adaptation unit may be iteratively repeated until a condition determining a satisfactory adaptation result is satisfied.

In an embodiment of the system, the scar map initialization unit comprises:

a vertex tagging unit for tagging vertices of the endocardium and epicardium meshes obtained from the prior segmentation of the endocardial and epicardial surfaces, as scar vertices, when the mesh vertices satisfy a tagging condition based on the short axis image data; and a first labeling unit for labeling pixels of the image as scar map pixels, based on the tagged scar vertices of the endocardium and epicardium meshes.

The tagging condition is typically based on the voxel values of SA image data. The meshes with tagged vertices are aligned with the LA image data. Image pixels derived from the LA image data, which are close to the tagged vertices, are labeled as scar pixels.

In an embodiment of the system, the at least one criterion function term defined on the basis of the scar map is a homogeneity term or a contrast term. The homogeneity term and the contrast term, described for example in Ciofolo, C.; Fradkin, M.; Mory, B.; Hautvast, G.; Breeuwer, M. "Automatic myocardium segmentation in late-enhancement MRI", 5th IEEE International Symposium on Biomedical Imaging: From Nano to Macro, 2008. 14-17 May 2008, Pages: 225-228, hereinafter referred to as Ref. 1, improve the chance of having pixels representing the scar tissue included in the myocardium.

In an embodiment of the system, the scar map update unit comprises:

a band definition unit for defining a region of interest in the image, based on the template adapted to the image; and a second labeling unit for labeling pixels of the image as scar map pixels, based on the defined region of interest.

For example, in an exemplary embodiment, pixels comprised in the region of interest and having a brightness higher than a threshold value are labeled as scar map pixels.

In an embodiment of the system, the template is a closed ribbon defined by an external and internal closed contour. The closed ribbon template is useful for modeling epicardial and endocardial contours of the myocardium.

In an embodiment, the system is further arranged for receiving a user input for defining terms to be included in the criterion function and for determining their weights. For example, the user may provide an input for determining weights of various terms of the criterion function. In an embodiment of the system, the user input comprises the type of scar present in the myocardium. The system is arranged to compute the weights of the terms of the criterion function on the basis of the inputted type of scar. Additionally or alternatively, other parameters of the criterion function may be computed on the basis of the type of scar. The types of scar may include a small or diffuse scar, a large transmural scar, a sub-endocardial scar, and/or no scar.

In a further aspect of the invention, the system according to the invention is comprised in an image acquisition apparatus.

In a further aspect of the invention, the system according to the invention is comprised in a workstation.

In a further aspect, the invention provides a method of delineating endocardial and epicardial contours of the heart in an image computed from long-axis image data, using a template defining curves for delineating the endocardial and epicardial contours in the image, the method comprising:

a scar map initialization step for initializing a scar map for use in adapting the template to the image, based on a prior segmentation of the endocardial and epicardial surfaces on the basis of the short-axis image data; and an adaptation step for adapting the template to the image, using a criterion function, the criterion function comprising terms describing attraction of the template to image features and terms describing internal interactions within the template, and wherein at least one term of the criterion function is defined on the basis of the scar map.

In a further aspect, the invention provides a computer program product to be loaded by a computer arrangement, the computer program product comprising instructions for delineating endocardial and epicardial contours of the heart in an image computed from long-axis image data, using a template defining curves for delineating the endocardial and epicardial contours in the image, the computer arrangement comprising a processing unit and a memory, the computer program product, after being loaded, providing said processing unit with the capability to carry out the tasks of:

initializing a scar map for use in adapting the template to the image, based on a prior segmentation of the endocardial and epicardial surfaces on the basis of the short-axis image data; and adapting the template to the image, using a criterion function, the criterion function comprising terms describing attraction of the template to image features and terms describing internal interactions within the template, and wherein at least one term of the criterion function is defined on the basis of the scar map.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
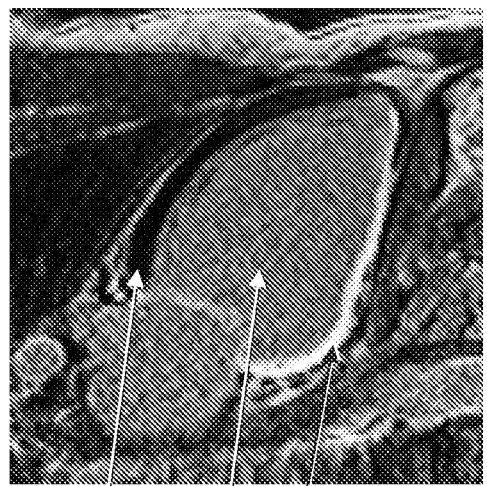
FIG. 1 shows two examples of LECMR LA 2-chamber views.
Figure 1:
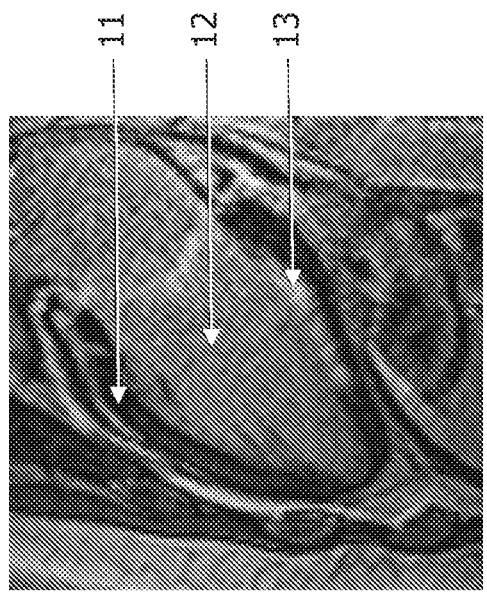
Figure 2:
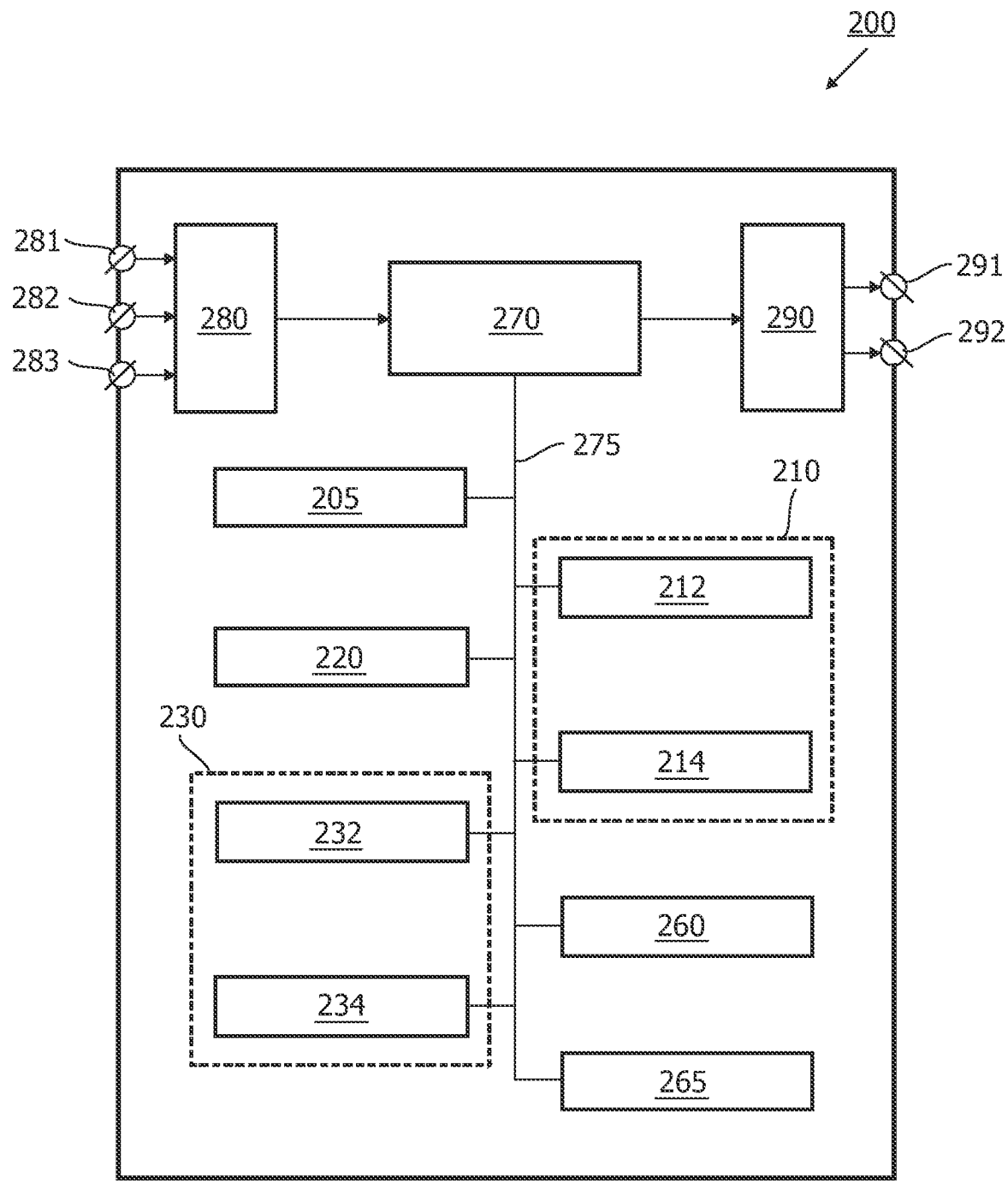
FIG. 2 schematically shows a block diagram of an exemplary embodiment of the system.

FIG. 2 schematically shows a block diagram of an exemplary embodiment of the system 200 for delineating endocardial and epicardial contours of the heart in an image computed from long-axis image data, using a template defining curves for delineating the endocardial and epicardial contours in the image, the system 200 comprising:

a template positioning unit 205 for positioning the template on the basis of short-axis image data;

a scar map initialization unit 210 for initializing a scar map for use in adapting the template to the image, based on a prior segmentation of the endocardial and epicardial surfaces on the basis of the short-axis image data; and an adaptation unit 220 for adapting the template to the image, using a criterion function, the criterion function comprising terms describing attraction of the template to image features and terms describing internal interactions within the template, and wherein at least one term of the criterion function is defined on the basis of the scar map.

The exemplary embodiment of the system 200 further comprises the following units:

a scar map update unit 230 for updating the scar map, based on the adapted template;

a control unit 260 for controlling the workflow in the system 200;

a user interface 265 for communicating with a user of the system 200; and a memory unit 270 for storing data.

In the exemplary embodiment of the system 200, the scar map initialization unit 210 comprises:

a vertex tagging unit 212 for tagging vertices of the endocardium and epicardium meshes, obtained from the prior segmentation of the endocardial and epicardial surfaces, as scar vertices, when the vertices satisfy a tagging condition based on the short axis image data; and a first labeling unit 214 for labeling pixels of the image as scar map pixels, based on the tagged scar vertices of the endocardium and epicardium meshes.

In the exemplary embodiment of the system 200, the scar map update unit 230 comprises:

a band definition unit 232 for defining a region of interest in the image, based on the template adapted to the image; and a second labeling unit 234 for labeling pixels of the image as scar map pixels, based on the defined region of interest.

In an embodiment of the system 200, there are three input connectors 281, 282 and 283 for the incoming data. The first input connector 281 is arranged to receive data coming in from a data storage means such as, but not limited to, a hard disk, a magnetic tape, a flash memory, or an optical disk. The second input connector 282 is arranged to receive data coming in from a user input device such as, but not limited to, a mouse or a touch screen. The third input connector 283 is arranged to receive data coming in from a user input device such as a keyboard. The input connectors 281, 282 and 283 are connected to an input control unit 280.

In an embodiment of the system 200, there are two output connectors 291 and 292 for the outgoing data. The first output connector 291 is arranged to output the data to a data storage means such as a hard disk, a magnetic tape, a flash memory, or an optical disk. The second output connector 292 is arranged to output the data to a display device. The output connectors 291 and 292 receive the respective data via an output control unit 290.

A person skilled in the art will understand that there are many ways to connect input devices to the input connectors 281, 282 and 283 and the output devices to the output connectors 291 and 292 of the system 200. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 200, the system 200 comprises a memory unit 270. The system 200 is arranged to receive input data from external devices via any of the input connectors 281, 282, and 283 and to store the received input data in the memory unit 270. Loading the input data into the memory unit 270 allows quick access to relevant data portions by the units of the system 200. The input data may comprise, for example, the LECMR SA image data and segmentation results, and the LECMR LA image data. Optionally, the input data may further comprise the template. The memory unit 270 may be implemented by devices such as, but not limited to, a Random Access Memory (RAM) chip, a Read Only Memory (ROM) chip, and/or a hard disk drive and a hard disk. The memory unit 270 may be further arranged to store the output data. The output data may comprise, for example, the template adapted to the long-axis image data according to the invention. The memory unit 270 may be also arranged to receive data from and/or deliver data to the units of the system 200 comprising the template positioning unit 205, the scar map initialization unit 210, the adaptation unit 220, the scar map update unit 230, the vertex tagging unit 212, the first labeling unit 214, the band definition unit 232, the second labeling unit 234, the control unit 260, and the user interface 265, via a memory bus 275. The memory unit 270 is further arranged to make the output data available to external devices via any of the output connectors 291 and 292. Storing data from the units of the system 200 in the memory unit 270 may advantageously improve performance of the units of the system 200 as well as the rate of transfer of the output data from the units of the system 200 to external devices.

Alternatively, the system 200 may comprise no memory unit 270 and no memory bus 275. The input data used by the system 200 may be supplied by at least one external device, such as an external memory or a processor, connected to the units of the system 200. Similarly, the output data produced by the system 200 may be supplied to at least one external device, such as an external memory or a processor, connected to the units of the system 200. The units of the system 200 may be arranged to receive the data from each other via internal connections or via a data bus.

In an embodiment of the system 200, the system 200 comprises a control unit 260 for controlling the workflow in the system 200. The control unit may be arranged to receive control data from and provide control data to the units of the system 200. For example, after adapting the template to the image computed from the image data, the adaptation unit 220 may be arranged to provide control data "the template is adapted to the image" to the control unit 260 and the control unit 260 may be arranged to provide control data "update the scar map" to the scar map update unit 230. Alternatively, a control function may be implemented, for example, in the scar map initialization unit 210, the adaptation unit 220, and/or the scar map update unit 230.

In an embodiment of the system 200, the system 200 comprises a user interface 265 for communicating with the user of the system 200. The user interface 265 may be arranged to receive a user input for the type of scar displayed on an image computed from the SA or LA image data, for defining the criterion function, e.g., for defining terms to be included in the criterion function and for determining their weights. The user interface may further provide means for selecting a view of the adapted template to be displayed on a display. A person skilled in the art will understand that more functions may be advantageously implemented in the user interface 265 of the system 200.

Embodiments of the invention will be now described with reference to delineating epicardial and endocardial contours in LECMR LA image data. A person skilled in the art will appreciate that the system is also useful for delineating epicardial and endocardial contours in LA image data comprising confusing structures such as scars and acquired using other techniques, e.g. PET or CT imaging.

Figure 3:
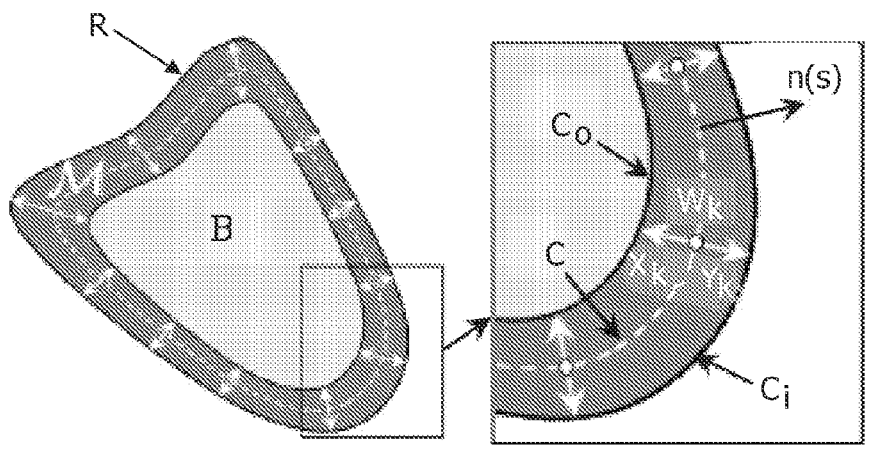
FIG. 3 illustrates a closed ribbon template.

In an embodiment of the invention, the template suitable for modeling myocardium M is a closed ribbon R as illustrated in FIG. 3. The template is implemented with interpolating splines, using as few nodes as possible to reduce the number of model parameters. In an embodiment, the spline parameters are defined by 10 nodes during adaptation of the template based on an initial scar map and 14 nodes during adaptation of the template based on an updated scar map. Using splines yields optimally smooth solutions. Furthermore, the specific choice of interpolating basis functions and node points, as opposed to approximating functions and control points, increases the algorithm stability and the consistency of the optimization strategy. Using splines for delineating contours in images is described in a paper by P. Brigger, J. Hoeg and M. Unser, "B-Spline Snakes: A Flexible Tool for Parametric Contour Detection", *IEEE Transactions on Image Processing*, Vol. 9, No. 9, pp. 1484-1496, 2000. More specifically, the myocardium M is modeled as a ribbon structure R, composed of a virtual centerline C comprising a plurality of nodes (schematically illustrated by the dots) and described by width parameters (schematically illustrated by the arrows). Both the centerline and the width are continuous spline interpolations of a finite set of variables $(x_k, y_k, w_k)$, where $x_k, y_k$ denote the centerline k-th node coordinates in an image coordinate system, and $w_k$ is the width of the ribbon at the centerline k-th node. The nodes of the centerline C are interpolated by a spline function C(s) of a spline interpolation parameter s. Similarly, the widths $w_k$ of the ribbon template R are interpolated by a spline function w(s). Among the advantages of this representation are the natural coupling between the epicardium $C_i$ and the endocardium $C_o$ and the sampling flexibility. The contours can be sampled at any desired precision using fast spline filters as described by M. Unser, A. Aldroubi and M. Eden, "B-spline Signal Processing; Part 1—Theory", *IEEE Transactions on Signal Processing*, Vol. 41, No. 2, pp. 821-832, 1993.

Figure 4:
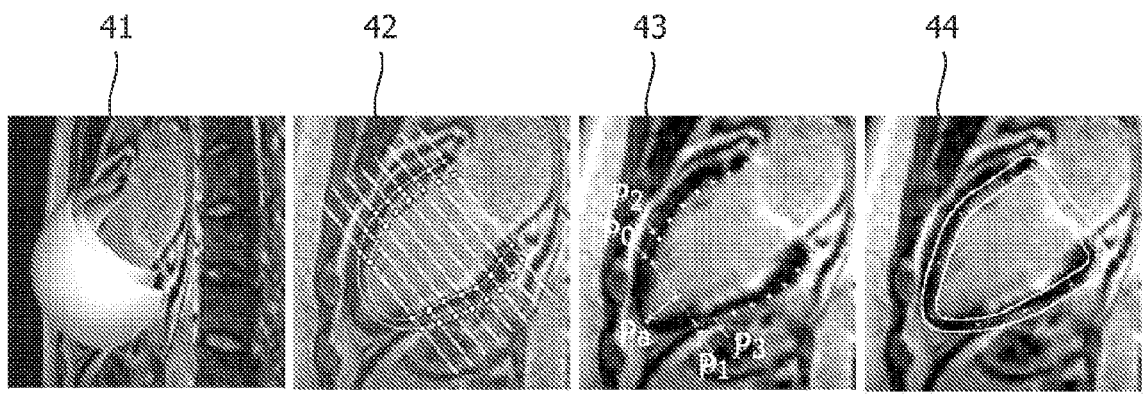
FIG. 4 illustrates initializing the closed-ribbon template.

Correctly positioning the geometrical template with no prior information concerning damaged tissues is very difficult, especially if large parts of the myocardium are affected. For this reason, the template is initialized by a template positioning unit 205, using the segmentation result that is obtained in the SA images acquired in the same examination as the LA views. A method of segmenting LECMR SA images is described in Ref. 1. The segmentation result consists of two 3D meshes representing the inner and outer myocardium walls in the stack of SA images. FIG. 4 illustrates initializing the closed ribbon template.

These meshes are placed in the LECMR LA image data space, as shown in picture 41. To initialize the template position, the intersections between the meshes, the SA slices, and the LA plane are computed. This leads to obtaining pairs of points representing endocardial and epicardial nodes of the template sampled along the myocardium as shown in picture 42. The locations in the middle between these pairs of nodes define the nodes of the centerline as shown in picture 43. However, because SA and LA images are typically acquired at different breath-holds, they are slightly misaligned and the intersections can be used for initialization of the template only. Each pair of points then defines the template width associated with a node initially positioned at the center of the pair. As the SA slices do not intersect the left ventricle apical area, an additional node is computed by extrapolation, e.g. as $$x_{p_a} = \frac{1}{2}(x_{p_0} + x_{p_1}) + (x_{p_0} - x_{p_2}) + (x_{p_1} - x_{p_3}),$$

where $x_{p_i}$ is the position vector of the node $p_i$, i=0, 1, 2, 3. The width associated with the extrapolated $p_a$ node is the average width computed over all the other nodes. Picture 43 in FIG. 4 illustrates the described extrapolation. Finally, the centerline is interpolated from the position of the nodes and the nodes are equally re-sampled to obtain the initial template. The width of the ribbon structure of the template may be constant, e.g. an average width of the myocardium computed based on the SA segmentation results. Picture 44 in FIG. 4 shows an exemplary initial template position after re-sampling node points.

In the system 200, the scar map is initialized by the scar map initialization unit 210 on the basis of the short-axis segmentation result. The SA image data has the same scale as the long-axis image data. The SA image data is used to identify the myocardial scar tissue. The map is then applied to the LA image data. Optionally, the map may be further processed based on the LA image data.

In an embodiment of the system 200, the scar vertex tagging unit 212 of the scar map initialization unit 210 is arranged to compute, for each vertex, the average intensity along a normal projected from the vertex and directed towards the myocardium. When the computed average intensity is higher than a threshold determined on the basis of the mean grey level inside the blood pool, the vertex is tagged as belonging to abnormal tissue.

Figure 5:
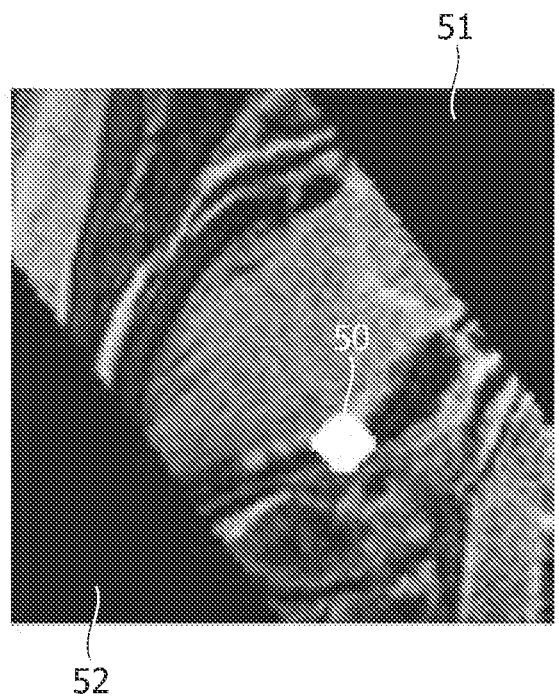
FIG. 5 illustrates an exemplary initial scar map.

The first labeling unit 214 of the scar map initialization unit 210 is arranged to map the scar-tagged vertices of the endocardium and epicardium meshes defined in the SA image data volume into the LA image data space, e.g. by transforming SA image data coordinates into LA image data coordinates. Because there is no prior information concerning abnormal tissues in the regions of the long-axis image that correspond to pixels located above the highest short-axis slice or below the lowest short-axis slice, these regions are labeled as "unknown" on the scar map by the first labeling unit 214. Then first labeling unit 214 is further arranged to label pixels, which are close to a vertex tagged as belonging to abnormal tissue, as "probable scar". For example, vertices which are close to the image plane and tagged as belonging to abnormal tissue, are projected on that plane and the corresponding pixels are labeled as "probable scar". The regions defined by the labeled pixels may be dilated using a dilation operation. FIG. 5 illustrates an exemplary initial scar map 50. The shown map also comprises "unknown" regions 51 and 52.

The adaptation unit 220 is arranged for adapting the template to the image, using a criterion function, the criterion function comprising terms describing attraction of the template to image features and terms describing internal interactions within the template, and wherein at least one term of the criterion function is defined on the basis of the scar map.

As part of, in addition to, or in combination with the internal and external energy terms, further possible terms of the energy function include, but are not limited to, terms relating to:

Regularity: Width variations along the centerline C should be limited. This ensures a proper coupling between the contours. A possible choice is a measure of dispersion of the width variable around its mean.

Blood pool Homogeneity: Except for papillary muscles, the blood pool should be homogeneous. A possible choice is the variance of the interior region, after exclusion of the lowest part of the histogram to account for the possible presence of the papillary muscles.

Myocardium Homogeneity The myocardium region should be homogenously distributed and dark if the tissue is normal, otherwise it should be white.

Endocardium contrast: Blood pool should locally show a higher intensity than the myocardium, which can be measured by the sum of 1-D contrast filters (defined, e.g. on the basis of the first derivative of a Gaussian filter) along the normals to the endocardium contour.

Epicardium contrast: Epicardium should show a positive, negative or ridge-like contrast depending on surrounding organs. This can be measured by the sum of 1-D ridge contrast filters (defined, e.g. on the basis of the second derivative of a Gaussian filter) along the normals to the epicardium.

Myocardium contrast: The average intensity of a healthy myocardium should be less than the average intensity of the blood pool. However, in the presence of extensive scars the average intensity of the myocardium may be greater than that of the blood pool.

Shape similarity: The template should be similar to a pre-defined shape modeling a myocardium.

In an embodiment, the criterion function is a weighted sum of criterion function terms. The weights are user-specified parameters of the algorithm. Alternatively or additionally, the criterion function may be a force field acting on the template and the criterion condition may be that the force field is substantially zero.

In an embodiment of the invention, the template is adapted to the LECMR LA image data, using the optimization scheme described in Ref. 1, by minimizing criterion functions whose terms are based on endocardium contrast, epicardium contrast, global myocardium contrast with respect to the blood pool, a homogeneity measure, and a pre-defined shape. The contrast terms are computed using the same principle as in Ref. 1 for short-axis images without taking scars into account. However, the scar map is used in the homogeneity measure. Both the location and number of pixels which are labeled as "probable scar" are taken into account.

Figure 6:
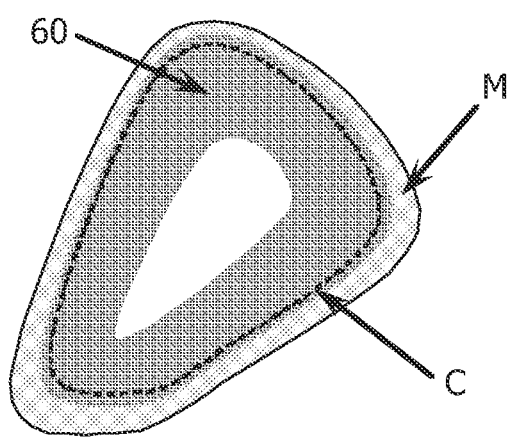
FIG. 6 illustrates an exemplary way of defining of a region of interest.

In an embodiment, the system 200 further comprises a scar map update unit 230 for updating the scar map, based on the adapted template. After the template adaptation, the scar map is reset and then updated. FIG. 6 illustrates an exemplary way of defining a region of interest, based on the centerline C of the adapted myocardium. First, a region of interest 60 is defined by extracting a band around the centerline of the template, with an offset towards the blood pool and whose width is equal to twice the mean width of the template. Then, in this region, all pixels whose intensity is higher than a threshold value, which may be defined as a number close to the average blood pool intensity, are labeled as "probable scar". Finally, the scar map is refined with successive binary morphological operations: first it is closed with a large structuring element to close holes, then it is opened with a small structuring element to remove isolated scar labels. The position of the region of interest is offset towards the blood pool to ensure that sub-endocardial scars are included in the new scar map.

Figure 7:
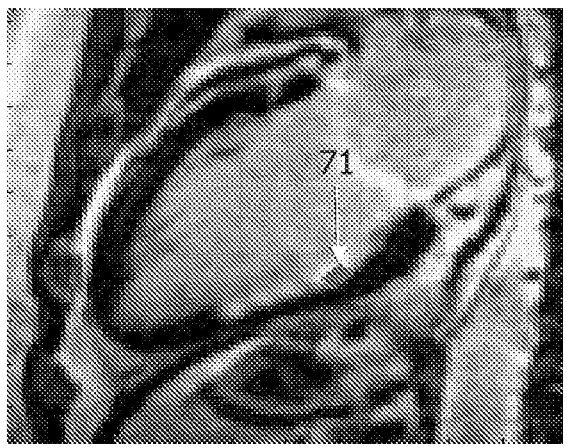
FIG. 7 shows two exemplary scar maps 71 and 72 after, respectively, the first and second update.
Figure 7:
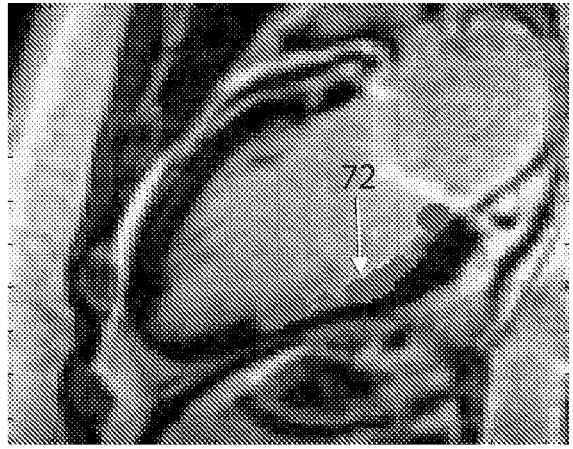

FIG. 7 shows two exemplary scar maps 71 and 72 after, respectively, the first and second update. The first scar map 71 comprises only the brightest pixels among the pixels of abnormal tissue. The second scar map, however, comprises pixels of all abnormal tissue.

In an embodiment of the invention, adapting the template to the image data is limited to the areas near scars, and the search of image features for attracting the epicardial and/or endocardial contours during adaptation is extended in order to capture sub-endocardial scars. This adapting may be referred to as local deformation of the template. Optionally, it may be implemented in a separate local deformation unit.

Figure 8:
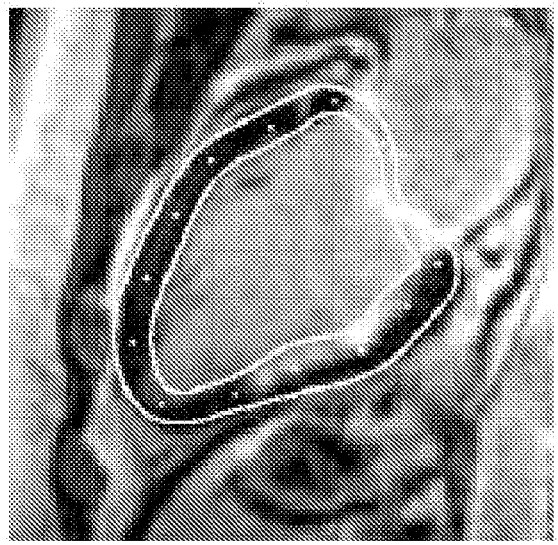
FIG. 8 shows exemplary results of delineation of epicardial and endocardial contours.

The system 200 was tested on a data set containing different long-axis views (2-chambers: left ventricle+left atrium and 4-chambers: left and right ventricles+left and right atria) and presenting various types of abnormal tissues: large, transmural scars, sub-endocardial scars, and small, low-contrast and diffuse scars. FIG. 8 shows exemplary results of delineation of epicardial and endocardial contours by the system according to the invention, wherein the myocardium comprises a sub-endocardial scar.

In an embodiment of the invention, the criterion function is an energy function describing the energy of the closed ribbon template. The energy function comprises internal energy terms and external energy terms. Internal energy terms attain a minimum when the template geometry is not deformed and identical with a typical template geometry based on a priori knowledge. External energy terms attain a minimum when the template is deformed so that certain parts of the template overlap with certain features detected in the image. The criterion condition is that the energy function attains a minimum.

In an embodiment of the invention, the criterion function F may be given by the following energy function:

$$F(p,I) = F_s(C,w) + F_c(C_i, C_o, I) + F_r(M, B, I),$$

where:

p is a parameter vector comprising the template parameters $(x_i, y_i, w_i)$ comprising the centerline node coordinates $(x_i, y_i,)$ and ribbon widths $w_i$;

w is the width vector comprising the widths $w_i$;

C, $C_i$ and $C_o$ are, respectively, the centerline, the inner and the outer contour of the closed ribbon template;

I is the image, i.e. a map which assigns intensities to image locations; and

M and B are, respectively, myocardium and blood pool regions defined by the closed ribbon template placement in the image.

The first term $F_s(C, w)$ is the template shape term and is an internal energy term. For example, $$F_s(C,w) = \lambda_0 \int_0^1 |C(s) - T(\tilde{C}(s))|^2 ds + \lambda_1 \int_0^1 |w'(s)|^2 ds,$$

where minimizing the first integral requires the template shape to be affinely similar to a pre-defined shape $\tilde{C}$. The minimum is defined by a minimum (over T) difference between the pre-defined contour transformed by an affine transformation T and the current contour C. A person skilled in the art will understand that s is the parameter of the spline representation of the closed ribbon template model. The second integral imposes a constraint on the variation of the template width w described by its first derivative w'.

The second term $F_c(C_i, C_o, I)$ is the contour term; this term is arranged to attract the epicardium and endocardium wall to preferred locations of the image gradients. It can be expressed as $$F_c(C_i, C_o, I) = \lambda_2 \int_0^1 \nabla I_{in}(s) ds - \lambda_3 \int_0^1 |\nabla I_{on}(s)| ds,$$

where $\nabla I_{in} = \nabla I(C_i(s)).n(s)$ and $\nabla I_{on} = \nabla I(C_o(s)).n(s)$, $\nabla I$ is the image gradient and n(s) is the outward pointing normal to the centerline. To implement this term, gradient filters that express prior knowledge on the relative intensity of normal and abnormal parts of the myocardium are used, as described in the paragraph on abnormal tissue detection.

The third term $F_r(M, B, I)$ is the region term. The blood pool gray levels should be homogeneously distributed. Also, normal myocardium tissues are dark while abnormal myocardium tissues are bright, which results in a strong global contrast with the blood pool. Therefore the region term is:

$$F_r(M, B, I) = \frac{\lambda_4}{|M|} \int_M |I(x, y) - \overline{m}| dx dy + \frac{\lambda_5}{|B|} \int_B |I(x, y) - \overline{b}| dx dy,$$

where the blood pool region B has an average intensity $\bar{b}$ and area $|B|$, while the intensity expected for the myocardium region M is $\bar{m}$.

The intensities of abnormal myocardial parts differ from those of healthy regions, which fact implies some adaptation of the criterion terms. Abnormal areas are detected with a map of abnormal tissues that is computed and updated. If the detection is positive, as damaged myocardium is brighter than the surrounding organs, the gradient filters defining the expected contrast along the borders are inverted. For the same reason, the expected value inside the myocardium $\bar{m}$ is the maximum value of the intensity range instead of the minimum value for healthy myocardium. These extremal values are not ad hoc parameters but come from the acquisition parameters of LECMR LA images, which are tuned so that the healthy myocardium appears as dark as possible and scars appear as bright as possible.

In an embodiment, the criterion function is not a differentiable function of the template parameters $(x_i, y_i, w_i)$, where i is the index of a node on the centerline, in particular because of the non-linear exclusion of the inside region histogram to account for papillary muscles. Usual gradient-descent methods thus are not an appropriate option for the minimization. Furthermore, any gradient-descent scheme has the intrinsic limitation of being very sensitive to local minima. The optimization scheme is based on a greedy algorithm, relying only on direct criterion computations. This choice provides a good compromise between computational complexity and sensitivity to initial conditions. The employed optimization scheme is more robust than a gradient-descent scheme and less complex than dynamic programming, a traditional choice for globally optimizing spline-based models. A greedy optimization strategy can be described by the following iterative algorithm:

Repeat
(A) Visit each node one by one,
Perform i-th node parameter $(x_i, y_i, w_i)$ value search within predefined ranges,
Move to the found optimal position which gives the lowest energy,
(B) Resample and move nodes along the centerline (slide) to increase rotation and parameterization invariance,
Until a steady state is found.

A person skilled in the art will appreciate that the system 200 may be a valuable tool for assisting a physician in many aspects of her/his job.

Those skilled in the art will understand that other embodiments of the system 200 are also possible. It is possible, among other things, to redefine the units of the system and to redistribute their functions. Although the described embodiments apply to medical images, other applications of the system, not related to medical applications, are also possible.

The units of the system 200 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 9:
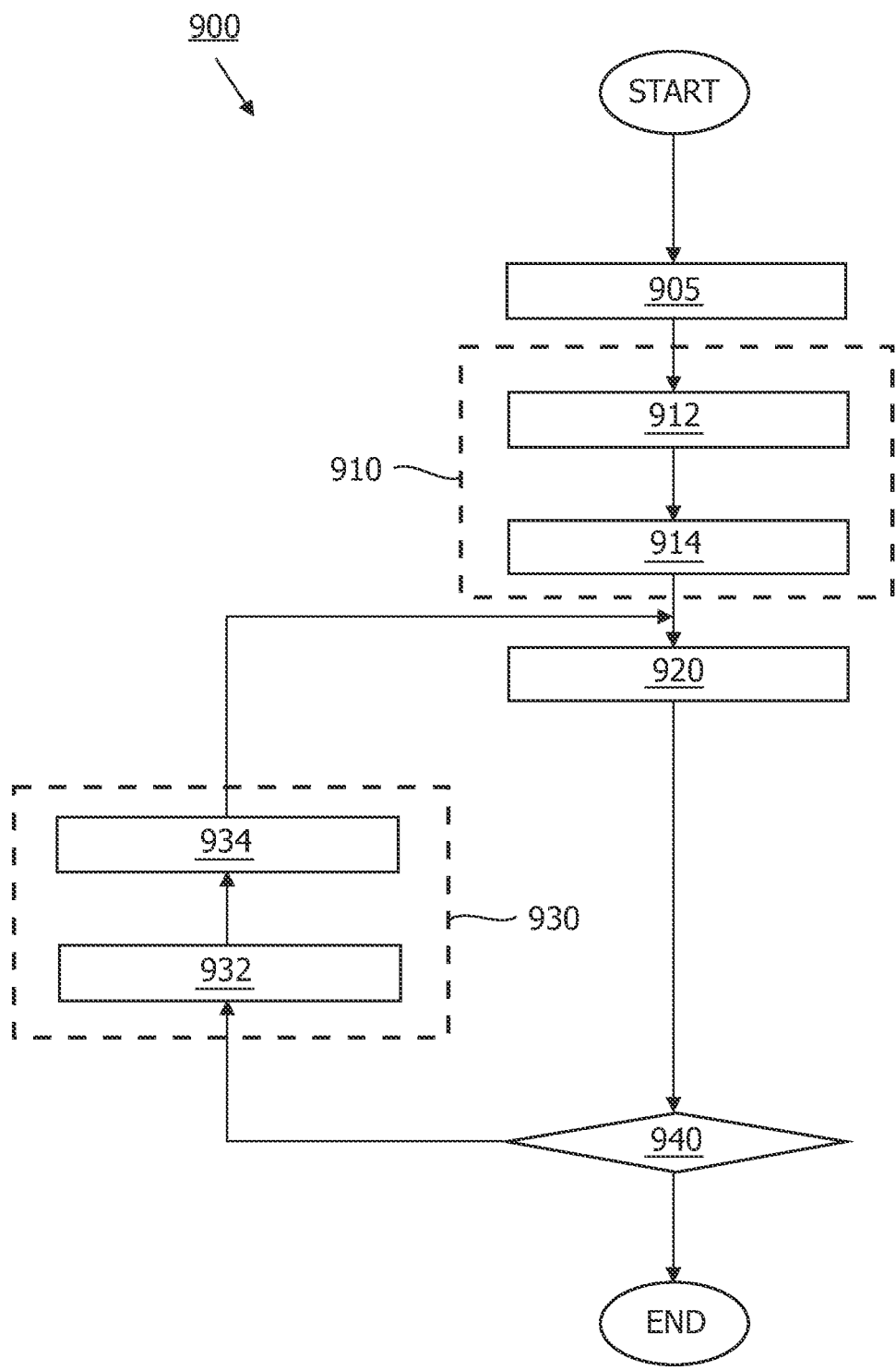
FIG. 9 shows a flowchart of an exemplary implementation of the method.

FIG. 9 shows a flowchart of an exemplary implementation of the method 900 of delineating endocardial and epicardial contours of the heart in an image computed from long-axis image data, using a template defining curves for delineating the endocardial and epicardial contours in the image. The method 900 begins with a template positioning step 905 for positioning the template on the basis of short-axis image data. After the template positioning step 905, the method continues with a scar map initialization step 910 for initializing a scar map for use in adapting the template to the image, based on a prior segmentation of the endocardial and epicardial surfaces on the basis of the short-axis image data. In an implementation of the method 900, the map initialization step comprises a vertex tagging step 912 for tagging vertices of the endocardium and epicardium meshes, obtained from the prior segmentation of the endocardial and epicardial surfaces and the short-axis image data, as scar vertices, when the vertices satisfy a tagging condition, followed by a first labeling step 914 for labeling pixels of the image as scar map pixels, based on the tagged scar vertices of the endocardium and epicardium meshes. After the map initialization step 910, the method 900 continues with an adaptation step 920 for adapting the template to the image, using a criterion function, the criterion function comprising terms describing attraction of the template to image features and terms describing internal interactions within the template, and wherein at least one term of the criterion function is defined on the basis of the scar map. In an implementation, after the adaptation step 920, the method 900 continues with a control step 940, where a condition, e.g. the number of scar map updates, is checked. If the condition is satisfied, e.g. if a maximum number of scar map updates is carried out, the method ends. Otherwise the method 900 continues with the scar map update step 930 for updating the scar map, based on the adapted template. In an implementation of the method 900, the scar map update step 930 comprises a band definition step 932 for defining a region of interest in the image, based on the template adapted to the image, followed by a second labeling step 934 for labeling pixels of the image as scar map pixels, based on the defined region of interest. After the scar updating step 930, the method 900 continues to the adaptation step 920.

A person skilled in the art may change the order of some steps or perform some steps concurrently using threading models, multi-processor systems or multiple processes without departing from the concept as intended by the present invention. Optionally, two or more steps of the method of the current invention may be combined into one step. Optionally, a step of the method of the current invention may be split into a plurality of steps.

Figure 10:
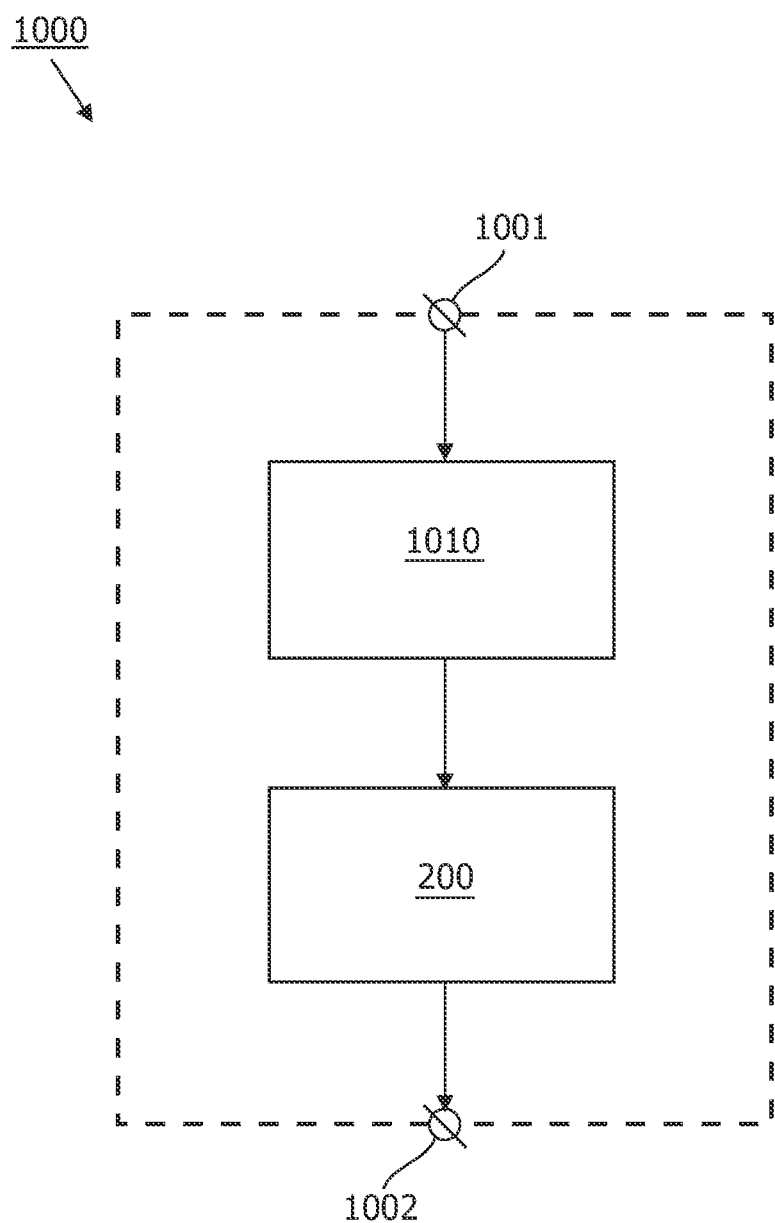
FIG. 10 schematically shows an exemplary embodiment of the image acquisition apparatus.

FIG. 10 schematically shows an exemplary embodiment of the image acquisition apparatus 1000 employing the system 200, said image acquisition apparatus 1000 comprising an MR image acquisition unit 1010 connected via an internal connection with the system 200, an input connector 1001, and an output connector 1002. This arrangement advantageously increases the capabilities of the image acquisition apparatus 1000, providing said image acquisition apparatus 1000 with advantageous capabilities of the system 200.

Figure 11:
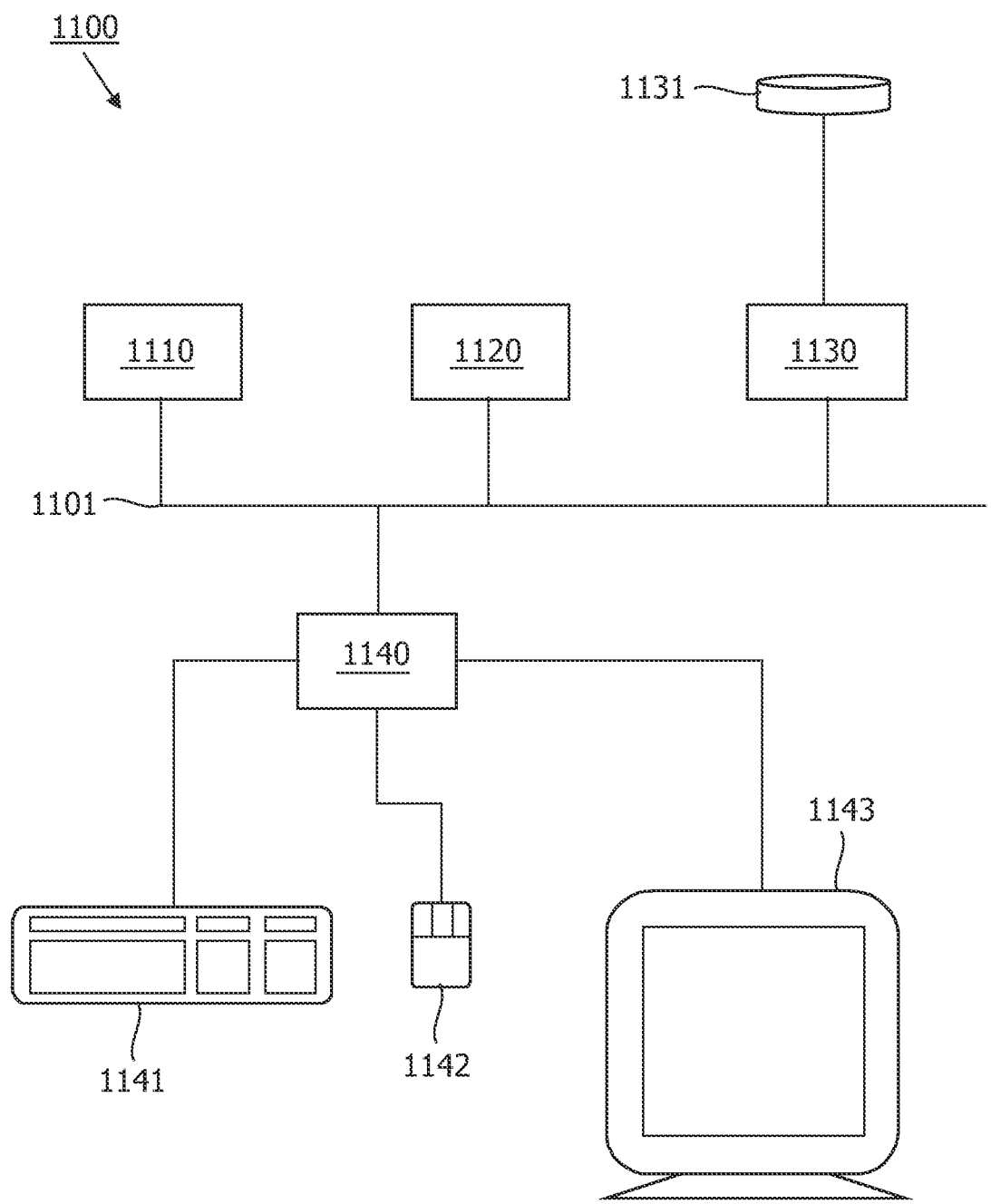
FIG. 11 schematically shows an exemplary embodiment of the workstation.

FIG. 11 schematically shows an exemplary embodiment of the workstation 1100. The workstation comprises a system bus 1101. A processor 1110, a memory 1120, a disk input/output (I/O) adapter 1130, and a user interface (UI) 1140 are operatively connected to the system bus 1101. A disk storage device 1131 is operatively coupled to the disk I/O adapter 1130. A keyboard 1141, a mouse 1142, and a display 1143 are operatively coupled to the UI 1140. The system 200 of the invention, implemented as a computer program, is stored in the disk storage device 1131. The workstation 1100 is arranged to load the program and input data into memory 1120 and execute the program on the processor 1110. The user can input information to the workstation 1100, using the keyboard 1141 and/or the mouse 1142. The workstation is arranged to output information to the display device 1143 and/or to the disk 1131. A person skilled in the art will understand that there are numerous other embodiments of the workstation 1100 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second, third, etc., does not indicate any ordering. These words are to be interpreted as names.

The invention claimed is:

1. A system (200) for delineating endocardial and epicardial contours of the heart in an image computed from long-axis image data, using a template defining curves for delineating the endocardial and epicardial contours in the image, the system (200) comprising:
    a template positioning unit (205) for positioning the template on the basis of short-axis image data;
    a scar map initialization unit (210) for initializing a scar map for use in adapting the template to the image, based on a prior segmentation of the endocardial and epicardial surfaces on the basis of the short-axis image data; and
    an adaptation unit (220) for adapting the template to the image, using a criterion function, the criterion function comprising terms describing attraction of the template to image features and terms describing internal interactions within the template, and wherein at least one term of the criterion function is defined on the basis of the scar map.

2. A system (200) as claimed in claim 1, further comprising a scar map update unit (230) for updating the scar map, based on the adapted template.

3. A system (200) as claimed in claim 1, wherein the scar map is initialized based on endocardium and epicardium meshes from the prior segmentation of short axis image data.

4. A system (200) as claimed in claim 3, wherein the scar map initialization unit (210) comprises:
    a vertex tagging unit (212) for tagging vertices of the endocardium and epicardium meshes, obtained from the prior segmentation of the endocardial and epicardial surfaces, as scar vertices, when the mesh vertices satisfy a tagging condition based on the short axis image data;
    a first labeling unit (214) for labeling pixels of the image as scar map pixels, based on the tagged scar vertices of the endocardium and epicardium meshes.

5. A system as claimed in claim 1, wherein the at least one criterion function term defined on the basis of the scar map is a homogeneity term or a contrast term.

6. A system as claimed in claim 1, wherein the scar map update unit (230) comprises:
    a band definition unit (232) for defining a region of interest in the image, based on the template adapted to the image;
    a second labeling unit (234) for labeling pixels of the image as scar map pixels, based on the defined region of interest.

7. A system (200) as claimed in claim 1, wherein the template is a closed ribbon defined by an external and an internal closed contour.

8. A system (200) as claimed in claim 1, further arranged for receiving a user input for defining terms to be included in the criterion function and/or for determining their weights.

9. A system (200) as claimed in claim 8, wherein the user input comprises the type of scar.

10. A method (900) of delineating endocardial and epicardial contours of the heart in an image computed from long-axis image data, using a template defining curves for delineating the endocardial and epicardial contours in the image, the method (900) comprising:
    a template positioning step (905) for positioning the template on the basis of short-axis image data;
    a scar map initialization step (910) for initializing a scar map for use in adapting the template to the image, based on a prior segmentation of the endocardial and epicardial surfaces on the basis of the short-axis image data; and
    an adaptation step (920) for adapting the template to the image, using a criterion function, the criterion function comprising terms describing attraction of the template to image features and terms describing internal interactions within the template, and wherein at least one term of the criterion function is defined on the basis of the scar map.

11. An image acquisition apparatus (1000) comprising a system (200) as claimed in claim 1.

12. A workstation (1100) comprising a system (200) as claimed in claim 1.

13. A computer program product to be loaded by a computer arrangement, comprising instructions for delineating endocardial and epicardial contours of the heart in an image computed from long-axis image data, using a template defining curves for delineating the endocardial and epicardial contours in the image, the computer arrangement comprising a processing unit and a memory, the computer program product, after being loaded, providing said processing unit with the capability to carry out the tasks of:
    positioning the template on the basis of short-axis image data;
    initializing a scar map for use in adapting the template to the image, based on a prior segmentation of the endocardial and epicardial surfaces on the basis of the short-axis image data; and
    adapting the template to the image, using a criterion function, the criterion function comprising terms describing attraction of the template to image features and terms describing internal interactions within the template, and wherein at least one term of the criterion function is defined on the basis of the scar map.

\* \* \* \* \*